US010743701B2

(12) United States Patent
Schoenemann et al.

(10) Patent No.: US 10,743,701 B2
(45) Date of Patent: Aug. 18, 2020

(54) EVAPORATOR DEVICE FOR WATER AND STEAMER HAVING AN EVAPORATOR DEVICE OF THIS KIND

(71) Applicant: E.G.O. Elektro-Geraetebau GmbH, Oberderdingen (DE)

(72) Inventors: Konrad Schoenemann, Sulzfeld (DE); Tobias Albert, Kraichtal (DE)

(73) Assignee: E.G.O. Elektro-Geraetebau GmbH, Oberderdingen (DE)

( * ) Notice: Subject to any disclaimer, the term of this patent is extended or adjusted under 35 U.S.C. 154(b) by 422 days.

(21) Appl. No.: 15/664,638

(22) Filed: Jul. 31, 2017

(65) Prior Publication Data

US 2018/0028013 A1    Feb. 1, 2018

(30) Foreign Application Priority Data

Aug. 1, 2016  (DE) .......................... 10 2016 214 178

(51) Int. Cl.
| | |
|---|---|
| *A47J 27/04* | (2006.01) |
| *F24C 15/32* | (2006.01) |
| *F22B 1/28* | (2006.01) |
| *F16T 1/00* | (2006.01) |

(52) U.S. Cl.
CPC ............... *A47J 27/04* (2013.01); *F16T 1/00* (2013.01); *F22B 1/284* (2013.01); *F22B 1/285* (2013.01); *F24C 15/327* (2013.01); *A47J 2027/043* (2013.01)

(58) Field of Classification Search
CPC ...... A47J 27/04; A47J 2027/043; F22B 1/285

USPC .......... 99/330, 410; 126/21 A, 369; 219/401
See application file for complete search history.

(56) References Cited

U.S. PATENT DOCUMENTS

| | | | |
|---|---|---|---|
| 859,271 A | 7/1907 | Wieland | |
| 4,697,067 A | 9/1987 | Rosset et al. | |
| 6,959,668 B2* | 11/2005 | Schreiner ................ | A47J 36/00 |
| | | | 122/26 |
| 7,208,702 B2* | 4/2007 | Choi ....................... | A47J 27/04 |
| | | | 126/369 |
| 2008/0163757 A1* | 7/2008 | Jeon ......................... | A21B 3/04 |
| | | | 99/330 |
| 2010/0083845 A1* | 4/2010 | Block ..................... | F22B 1/284 |
| | | | 99/330 |
| 2014/0000845 A1* | 1/2014 | Vanderwees ........... | F28F 27/00 |
| | | | 165/83 |

(Continued)

FOREIGN PATENT DOCUMENTS

| | | |
|---|---|---|
| DE | 102005059504 A1 | 6/2007 |
| DE | 102006029578 A1 | 1/2008 |
| DE | 102007054457 A1 | 5/2008 |

(Continued)

*Primary Examiner* — Lorne E Meade
*Assistant Examiner* — Benjamin C Clark
(74) *Attorney, Agent, or Firm* — Alston & Bird LLP

(57) ABSTRACT

An evaporator device for water for installation in a steamer has a water tank having an encircling outer wall and an encircling inner wall, wherein a heating device is provided on the outer wall. The inner wall extends within the outer wall and with a clearance relative thereto, wherein a water zone is formed between the outer wall and the inner wall. A pump is arranged within the inner wall in order to pump water from a water reservoir into the water zone. A steam outlet emerges upwards from the water zone and leads into the steamer.

22 Claims, 2 Drawing Sheets

(56) References Cited

U.S. PATENT DOCUMENTS

2016/0130923 A1* 5/2016 Nowitzki ................ F04D 13/10
                                                                                       166/66.4
2018/0038585 A1* 2/2018 Zhang ....................... F22B 1/28

FOREIGN PATENT DOCUMENTS

| EP | 0190954 A1 | 8/1986 | | |
|---|---|---|---|---|
| EP | 3225139 A1 | 10/2017 | | |
| WO | WO-2017101256 A1 * | 6/2017 | ................ | F22B 1/28 |

* cited by examiner

EVAPORATOR DEVICE FOR WATER AND STEAMER HAVING AN EVAPORATOR DEVICE OF THIS KIND

CROSS-REFERENCE TO RELATED APPLICATIONS

This application claims priority to German Application No. 10 2016 214 178.3, filed Aug. 1, 2016, the contents of which are hereby incorporated herein in its entirety by reference.

TECHNOLOGICAL FIELD

The invention relates to an evaporator device for water of the kind that can be used, in particular, in a steamer, and to a steamer of this kind or cooker operating with steam.

BACKGROUND

DE 102006029578 A1 discloses an evaporator device having a general heating system and a laterally arranged chamber. There, the water level in a water zone and thus in the evaporator device can be detected in a practical and reliable manner by means of sensors.

US 2010/083845 A1 discloses another evaporator device, which is designed in the manner of a round vertical tube. A heating device is provided on an outer wall of the tubular water tank. Steam emerges at the top from the evaporator device or a water zone formed in the tube.

BRIEF SUMMARY

It is the underlying object of the invention to provide an evaporator device mentioned at the outset and a steamer or cooker provided therewith by means of which problems of the prior art can be solved and, in particular, by means of which it is possible to enable a practical and efficient evaporator device to be well integrated into a corresponding steamer.

This problem is solved by an evaporator device and by a steamer or cooker. Advantageous and preferred embodiments of the invention form the subject matter of the further claims and are explained in greater detail below. In this context, some of the features are described only in connection with the evaporator device or only in connection with the steamer or cooker. However, the intention is that it should be possible, having them independent from the device or steamer/cooker, to apply them both to the evaporator device and to the steamer or cooker as self-contained and mutually independent features. The wording of the claims is incorporated into the description by express reference.

It is envisaged that the evaporator device has a water tank having an encircling outer wall, which delimits the water tank or a water zone within the tank. A heating device is provided on the outer wall, advantageously on the outside thereof, the heating device advantageously being of flat design. An inner wall is, in turn, provided in the water tank, the inner wall extending within the outer wall and advantageously having a clearance relative thereto at all points. Both are of encircling design, advantageously in the form of rings one inside the other. A water zone extending or formed between the outer wall and the inner wall contains the water to be evaporated and is advantageously of encircling design, particularly advantageously with the shape determined by the inner wall and the outer wall. This can be a circular ring.

An inner zone is formed within the inner wall, and arranged within the zone is a pump, which serves to pump water from a water reservoir, which can be arranged outside the evaporator device, into the water zone. For this purpose, a corresponding water line extends from the water reservoir to the pump. Emerging upwards from the water zone there is furthermore a steam outlet, through which steam produced, which is formed, in particular, above the water zone and rises, is collected, accumulated and passed into the interior of the steamer or cooker.

By virtue of the integration of the pump into an inner zone within the inner wall, the installation space previously required for the pump outside the water tank is freed for other functional units or for a somewhat larger design of the water zone or of the evaporator, thus making it possible overall to provide a larger and more powerful evaporator with a higher evaporator output. A pump of this kind for topping up the water zone or for feeding water to the evaporation process does not normally have to be particularly powerful and thus does not need to be very large. Thus, it can even be installed in a relatively small evaporator device or in a small inner zone within an inner wall of an encircling or annular water tank. Moreover, a water path from the abovementioned water reservoir to the water zone, i.e. the location of evaporation, can then be kept relatively short. In this case, the inner zone is advantageously a space surrounded by the water tank, at least laterally. It is particularly advantageous if the inner zone in which the pump is arranged is free from water or dry. This should apply to any operating state.

The type of pump is of secondary importance. It can be an impeller pump or, alternatively, an axial pump or a magnetic resonance pump of the kind used especially in coffee and espresso machines.

As a development of the invention, a water feed line from the outside directly to the pump is provided, wherein a water line in the form of a tube or, alternatively, in the form of a flexible water hose can advantageously be used for this purpose. A further water line can lead from the pump into the water zone, in particular from above into the water zone or more than halfway up the water zone. In certain circumstances, it is also possible to connect and secure an outlet of the pump directly to the water zone or a wall of the water zone or to the inner wall. There is then no need for a further water line between the pump and water zone or inner wall. This can help to reduce problems with sealing. Moreover, an even more space-saving arrangement of the pump in the inner zone or within the inner wall can be achieved.

As a further development of the invention, provision can be made for a closed fresh water zone to be provided, the freshwater zone being provided within the water zone so as to be at least partially encircling, preferably fully encircling. This preferably annular freshwater zone is situated within the water zone and thus within the inner wall. By means of this freshwater zone, in the interior of which the pump is arranged according to the invention, the pump is shielded or thermally insulated from radiant heat from the water zone, in which the water is boiling during the operation of the evaporator device. In this way, temperature problems for the pump can be reduced or prevented. Moreover, the freshwater zone can be well coupled thermally to the inner wall of the water zone or can be separated from the heatable water zone only by the inner wall. It is thereby possible to ensure that the water zone as it were preheats or simultaneously heats the fresh water zone. In this way, the water in the freshwater zone can already be raised somewhat to temperature, and therefore the heating effort and, especially, a heating time are no longer so great within the water zone for evaporation.

As an alternative, the freshwater zone can be thermally insulated from the inner wall of the water zone in order to avoid dissipating heating energy therefrom.

Freshwater can be fed into the freshwater zone from the outside by means of a water line or water feed line, in particular from the abovementioned water reservoir of the steamer. By means of a water line, the freshwater zone can be connected to the pump in the interior. As an alternative, the pump can be connected directly to an opening in the inner wall of the freshwater zone, in a manner similar to that described above, thus eliminating the need for intermediate water lines, hoses or the like. Water can then be fed into the water zone by means of the pump using a water line or a hose. Admittedly, this can also pass from the internally situated pump through the freshwater zone into the water zone, e.g. in a lower zone or right at the bottom along a base of the evaporator device. As an alternative, a separate water line or a hose can project upwards from the pump into the water zone.

In yet another alternative, it is possible, especially if parts of the evaporator device, preferably the inner wall of the water zone and the inner wall of the freshwater zone, are composed of plastic, to envisage that two openings are provided in an inner wall of the freshwater zone. One opening directly enters the freshwater zone. The other opening can be adjoined by a kind of integrally moulded or integrally formed passage which, as it were, passes through the freshwater zone and opens into the water zone via a further opening in the inner wall of the water zone. A correspondingly designed pump having two water connections can then be connected as a modular unit to these two openings in the inner wall of the freshwater zone. This pump draws water out of the freshwater zone through the simple opening and pumps it through the passage, which crosses the freshwater zone, into the water zone. All that is then necessary is to provide a water line from the abovementioned water reservoir to the freshwater zone.

In yet another development of the invention, the evaporator device can be formed as a one-piece plastics part with the abovementioned water zone, the freshwater zone and the openings therein and possibly also with a water bushing, in particular as an injection moulding. In this way, problems with sealing are reduced or avoided and fewer or no separate expensive seals are required.

As a further development of the invention, it is possible for a dividing wall to be arranged in the water zone, the wall dividing the water zone into an outer zone and an inner zone. A dividing wall of this kind advantageously extends vertically or parallel to the outer wall and/or inner wall. The dividing wall can extend approximately centrally between the outer wall and the inner wall, with the result that it is at a similar distance or the same distance from both. Through passages, e.g. in the simple form of through openings, are preferably provided in the dividing wall, connecting an outer zone to an inner zone, thus allowing water flow. In this way, it is possible to ensure that the outer zone is relatively narrow, e.g. 1 cm wide or between 5% and 20% of the height of the outer zone or water zone. When the outer wall is heated, the heating power can thus be relatively high in relation to the water volume to be directly heated, and therefore steam generation starts relatively quickly. At the same time, the automatic inflow of additional water from the inner water zone through the dividing wall mentioned makes it possible to ensure that the water is not evaporated too quickly, which would, in turn, not only mean a reduction in steam production or even stoppage of the steam function but could also cause damage to the heating device due to an excess temperature. By virtue of the automatic inflow of additional water, there is also no need for any pumping means or the like to be used for this purpose. The through passages mentioned are advantageously provided in a lower zone, particularly advantageously right at the bottom at a base of the evaporator device. This ensures that the additional inflowing water does not disturb the evaporation process. In this way, it is furthermore possible for water to continue flowing out of the inner zone into the outer zone through the through passages for as long as possible.

A thick-film heating system is suitable as a heating device on the outer wall. This can be applied in parallel tracks, as a large continuous area or as tracks in other windings or loops and can thus bring about substantially large-area and uniform heating. A heating device of this kind can extend over most of the height in a vertical direction of the evaporator device. In certain circumstances, it can be subdivided into a plurality of different or independent heating circuits, which can be operated independently of one another. These different heating circuits can be divided in a vertical direction, e.g. as a lower heating circuit and an upper heating circuit and, in certain circumstances, also with an additional central heating circuit. Temperature sensors or a temperature monitoring system can be provided, either at different points or over a large area, as is known per se from the prior art.

A steam outlet above the water zone can be designed in such a way that it spans or covers the entire evaporator device and carries the accumulated steam away. As an alternative, a steam route to the steam outlet can be provided via an annular upper zone of the water zone, leaving free the zone above the inner zone, for example.

These and further features are apparent not only from the claims but also from the description and the drawings, wherein the individual features can each be implemented individually or severally in the form of subcombinations in the case of one embodiment of the invention and in different sectors and can represent advantageous and independently patentable embodiments, for which protection is sought here. The division of the application into individual paragraphs and subsections does not restrict the generality of the statements made therein.

BRIEF DESCRIPTION OF THE SEVERAL VIEWS OF THE DRAWINGS

Illustrative embodiments of the invention are shown schematically in the drawings and are explained in greater detail below. In the drawings.

DETAILED DESCRIPTION

Figure 1:
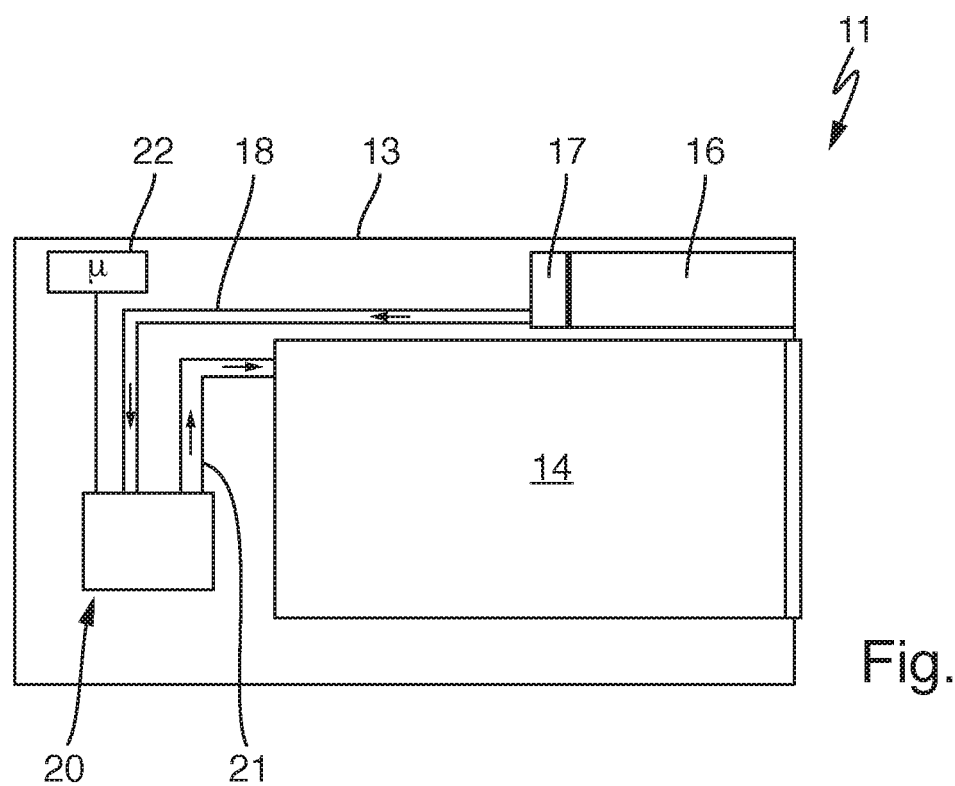
FIG. 1 shows a schematic side view of a steamer according to the invention with an evaporator device according to the invention.

FIG. 1 shows a steamer 11 according to the invention with a housing 13 and a muffle 14, in which food can be prepared by means of steam. The steamer 11 has a water reservoir 16, e.g. as a removable tank. It can be connected by means of a coupling connection 17 to a water feed line 18 leading to an evaporator device 20. A steam line 21 leads from the evaporator device 20 into the muffle 14. Via the water feed line 18, therefore, freshwater can be introduced into the evaporator device 20 from the water reservoir 16. Steam leaves the evaporator device 20 via the steam line 21 and is then introduced into the muffle 14 in a known manner.

Moreover, the steamer 11 has a controller 22, which is connected at least to the evaporator device 20. The controller 22 can advantageously also control other functions or all the functions of the steamer 11.

Figure 2:
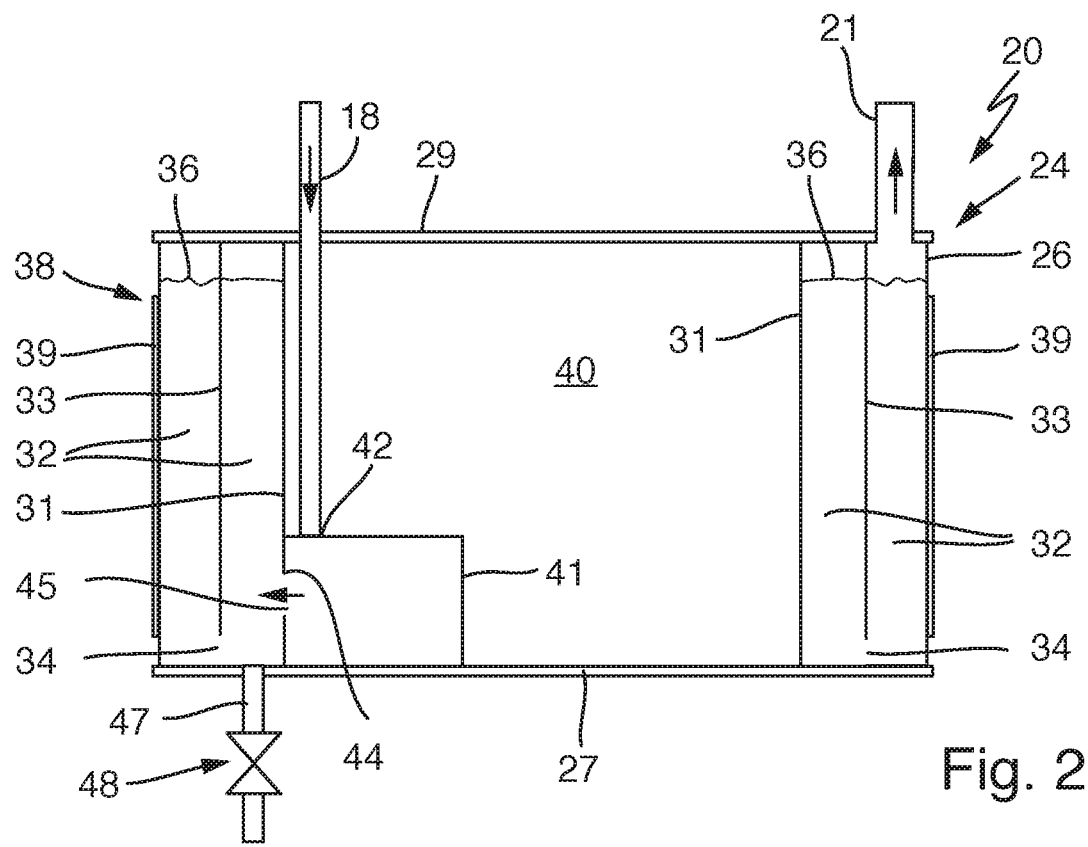
FIG. 2 shows an enlarged side view of an evaporator device according to the invention.

In FIG. 2, an evaporator device 20 according to the invention is illustrated in an enlarged side view corresponding to FIG. 1. It has a water tank 24, which is of tubular design or is designed as a short vertical tube with a round cross section, cf. also FIG. 4 and the associated explanations. The water tank 24 has an encircling outer wall 26, which is continuous and extends in the shape of a ring between a corresponding round base 27 and a round lid 29. It can be connected permanently thereto and, in certain circumstances, it can also be produced integrally with at least one of the two. A likewise annular inner wall 31 separates off an internally situated inner zone 40. The water zone 32 mentioned at the outset, which is filled with water 36, is formed between the inner wall 31 and the outer wall 26. Extending within this water zone 32 is a dividing wall 33, preferably parallel to the outer wall 26 and/or the inner wall 31. It is particularly advantageous if the dividing wall 33 extends centrally between these two walls. In the lower zone, it can have a plurality of through openings 34, advantageously in the form of simple holes or openings. Thus, additional water can as it were flow from the inner zone of the water zone 32 separated off by the dividing wall 33 into the outer zone.

A heating device 38 is provided on the outside of the outer wall 26, this advantageously being a flat heating device with heating elements 39 that are flat or cover a surface, which are illustrated only schematically here. In this connection, attention is drawn to US 2010/083845 A1, which describes heating devices or heating elements of this kind, advantageously in the form of thick-film heating elements. The heating device 38 can also be subdivided into a plurality of heating circuits, particularly in a vertical direction, which each have at least one heating element and can be operated independently of one another but also jointly. No further statements will be made in this connection. The heating device 38 or the at least one heating element 39 ends just above the base 27 and just below the lid 29.

A pump 41 is arranged in the free and dry inner zone 40 within the inner wall 31. The abovementioned water feed line 18 leads to a pump inlet 42 at the top of the pump 41. A pump outlet 44 goes to the water zone 32, in this case directly to an opening 45 in the inner wall 31. Such a direct connection at the pump inlet and the pump outlet, which has also been described at the outset, has the advantage that no additional lines, tubes, hoses or the like are required. At the same time, of course, the pump casing of the pump 41 must be precisely matched to the shape of the inner wall 31 in the region of the pump outlet 44. Alternatively, the pump outlet 44 can also have an integrally formed projecting stub or the like. This can be connected to, e.g. inserted into, the opening 45 in the inner wall 31. Sealing means can also be provided here.

In the evaporator device 20 in FIG. 2, the inner zone 40 surrounded by the water zone 324 in the water tank 24 is used to mount a pump 41 there. Under the control of the controller 22, for example, this pump can pump freshwater from the water feed line 18 into the water zone 32, more precisely in accordance with the requirement for freshwater. This is therefore dependent on the quantity of water 36 which has already been evaporated by means of the heating device 38 and has been discharged via the steam line 21 or a corresponding steam outlet above the outer zone of the water zone 32.

This steam outlet or the transition of the outer zone of the water zone 32 into the steam line 21 is not shown specifically here. However, it can be designed in the manner described in European Patent Application EP 16162893.8 filed on 30 Mar. 2016 by the same applicant. Attention is drawn to this document in this regard.

By means of the pump 41 arranged in the inner zone 40, the installation space otherwise required for this purpose within the housing 13 of the steamer 11 according to FIG. 1 can be saved. Moreover, as the direct connection of the pump 41 to the inner wall 31 is intended to show, it may be possible to reduce interfaces between lines, leading to simpler assembly and a more leaktight embodiment of the steamer 11.

Subdividing the water zone 32 into an inner zone and an outer zone by means of the dividing wall 33 serves to ensure that the heating device 38 need only heat a relatively small water volume, involving only the outer zone, i.e. that between the outer wall 26 and the dividing wall 33, to generate steam. However, additional water can flow in automatically and spontaneously through the inner zone with the through openings 34 in the dividing wall 33, even if the pump 41 does not operate immediately, and therefore boiling dry cannot occur as quickly and the risk of boiling dry, together with the possible damage to the heating device 38 or even to the entire evaporator device 20, is reduced.

A drain stub 47 is furthermore provided on the bottom of the water tank 24 or the base 27 thereof. It has a drain valve 48. This enables residual water from the evaporator device 20 or the water tank 24 to be drained off in order to avoid hygiene problems due to water standing for a long time if the steamer 11 is not used. However, this is fundamentally known.

Figure 3:
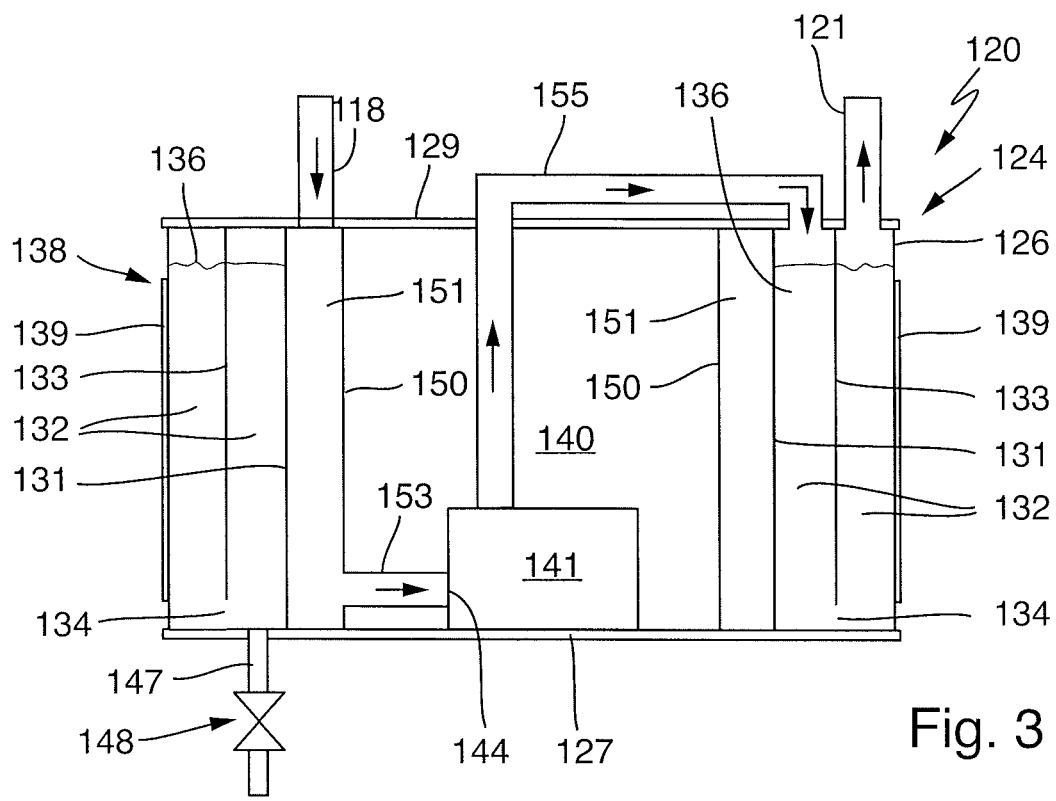
FIG. 3 shows a side view of an alternative evaporator device according to the invention.
Figure 4:
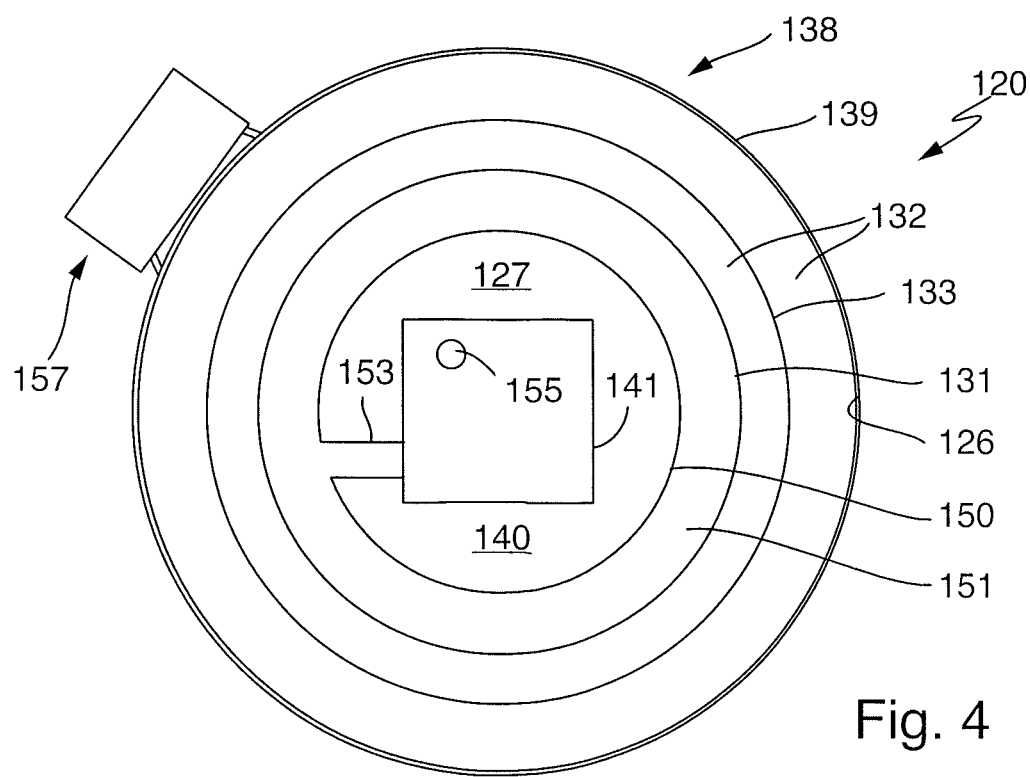
FIG. 4 shows a sectioned plan view of the evaporator device from FIG. 3.

FIG. 3 shows an alternative evaporator device 120 according to the invention, which is of similar design to that in FIG. 2. It has a water tank 124 with an annular encircling outer wall 126, a base 127 and a lid 129. An annular encircling inner wall 131, which extends parallel to the outer wall 126, defines with the latter a water zone 132 therebetween. The water zone 132 is subdivided into an inner zone and an outer zone by a dividing wall 133. As the plan view or sectioned view of the evaporator device 120 from above in FIG. 4 shows here, the outer wall 126, the inner wall 131 and the dividing wall 133 are formed parallel and concentrically to one another in a ring shape. The dividing wall 133 has a plurality of through openings 134 in the lower zone. Provided on the outside of the outer wall 126 is a heating device 138 having at least one heating element 139, as has already been described above. An electrical connection thereto can be formed by the connector 157 illustrated in FIG. 4, which is advantageously designed as a plug connection.

In addition to the evaporator device 20 from FIG. 2, a wall 150 is furthermore provided within the inner wall 131, the wall 150 likewise being designed concentrically and in the form of a ring or tube according to FIG. 4. It extends substantially continuously between the base 127 and the lid 129 as far as an opening for a tubular stub 153 leading out therefrom. A freshwater zone 151 is formed between the inner wall 131 and wall 150. The water feed line 118 from the water reservoir of the steamer leads into the freshwater zone from above. The pump 141 in the inner zone 140 of the evaporator device 120 takes water from the freshwater zone 151 via the tubular stub 153 as required. It pumps this freshwater into the inner zone of the water zone 132 from above as required via a pipe 155. A steam line 121 and a pump inlet 144 are also provided, the steam line 121 being configured the same as the steam line 21 illustrated and described relative to FIG. 2.

The advantage of a freshwater zone 151 of this kind is less that the pump 141 can draw the freshwater for evaporation from a reservoir situated close by than that the ring of freshwater 151 around it (visible in plan view in FIG. 4) makes it possible to provide good thermal insulation with respect to the heating device 138 on the outside of the evaporator device 120 and with respect to the heat which, of course, is also present via the hot water in the inner zone of the water zone 132 and thus also at the inner wall 131. For this purpose it is possible to provide thermal insulation around the pump, as is moreover the case with the evaporator device 20 shown in FIG. 2. This can be provided either only on the pump itself or, alternatively, on the wall situated closest to the pump. In FIG. 2, this is the inner wall 31, which can be thermally insulated on the inside by means of a greater wall thickness or corresponding thermal insulation materials, for example. In the case of the evaporator device 120 in FIG. 3, this would advantageously be on wall 150. In this way, less insulation material is required. Moreover, the freshwater zone 151 can also be preheated somewhat in advance. As an alternative, it is also possible, in turn, for installation of this kind to be provided on the inner wall 131, this then being for the purpose of not having to dissipate as much heat into the freshwater zone 151, thus increasing the heating power in the outer zone of the water zone 132 for the evaporation of the water 136 contained there.

In the case of the evaporator device 120 corresponding to FIG. 2 too, a drain stub 147 described above, together with a drain valve 148, is provided. The drain stub together with the drain valve can also be used quite generally to drain off this residual water mentioned. As an alternative, it can be used for a cleaning and descaling process to enable a corresponding liquid to be removed again as completely as possible after the process and also to enable flushing. Since such a process has to be carried out only infrequently, the drain valve can also be manually actuable, even if this requires an increased effort by an operator.

The pump 41 can be an impeller pump. As an alternative, it is also possible to provide any other pumps, e.g. magnetic resonance pumps, of the kind known from fully automatic coffee machines or portafilter machines for preparing coffee. The heating device can advantageously be designed as a thick-film heating device of the kind known from the abovementioned US 2010/083845 A1.

The size or volume of the outer zone and of the inner zone of the water zone and possibly of the freshwater zone 151 of the evaporator device 120 shown in FIG. 3 can be made so small that, after steam operation has been completed, i.e. when no more steam is required, no residual water has to be pumped back into the water reservoir. Only a small amount of residual water should remain, particularly in the water zone. This can then be evaporated directly to remove the water, even if the steamer or the cooking process actually does not require any more steam. In this way, a pump necessary for this purpose can be avoided and, overall, only a single pump need be provided to meter or feed freshwater into the evaporator device.

That which is claimed:

1. An evaporator device for water, comprising:
    a water tank comprising an encircling outer wall and an encircling inner wall;
    a heating device is provided on said outer wall;
    said inner wall extends within said outer wall and with a clearance relative thereto;
    a water zone is formed between said outer wall and said inner wall;
    a pump is arranged within said inner wall in order to pump water from a water reservoir into said water zone; and
    a steam outlet, which emerges upwards from said water zone,
    wherein:
        an inner zone is formed within said inner wall for arrangement of said pump therein; and
        said inner zone is dry or free from water.
2. The evaporator device according to claim 1, wherein a water feed line from outside of the evaporator device directly to said pump is provided, wherein a further water line leads from said pump into said water zone.
3. The evaporator device according to claim 2, wherein said water feed line comes from said water reservoir.
4. The evaporator device according to claim 2, wherein said further water line leads from said pump from above into said water zone.
5. The evaporator device according to claim 1, wherein said inner wall delimits said inner zone with respect to an outside of the evaporator device or in a radial direction with respect to said outside.
6. The evaporator device according to claim 1, further comprising a freshwater zone at least partially encircling said inner zone, said freshwater zone is surrounded by said water zone and located between the inner wall and another concentric wall, said freshwater zone is connected to said pump by means of a tubular stub water line through said another concentric wall.
7. The evaporator device according to claim 6, wherein said freshwater zone is annular and extends all the way round.
8. The evaporator device according to claim 7, wherein freshwater can be fed into said freshwater zone from outside by means of an input a water feed line.
9. The evaporator device according to claim 7, wherein said annular freshwater zone directly adjoins or extends directly along and likewise extends in a form of a ring around a radially inner side of said water zone.
10. The evaporator device according to claim 9, wherein said annular freshwater zone has a single common dividing wall between said water zone and said freshwater zone being formed by said inner wall.
11. The evaporator device according to claim 6, wherein said tubular stub water line leads from said freshwater zone to said pump in a lower zone of said freshwater zone.
12. The evaporator device according to claim 11, wherein said tubular stub water line leads from said freshwater zone to said pump in a lowermost zone.
13. The evaporator device according to claim 6, wherein a water feed line leads from said water reservoir into an upper zone of said freshwater zone.
14. The evaporator device according to claim 1, wherein an encircling dividing wall is arranged in said water zone, wherein said dividing wall forms a radially inner zone and a radially outer zone in said water zone.

15. The evaporator device according to claim 14, wherein said dividing wall is arranged centrally in said water zone in a radial direction and/or at a constant distance from said outer wall.

16. The evaporator device according to claim 14, wherein at least one through passage is provided through said dividing wall between said radially inner zone and said radially outer zone.

17. The evaporator device according to claim 16, wherein at least one of said through passage is provided in a lower zone of said dividing wall.

18. The evaporator device according to claim 14, wherein said dividing wall divides a radially inner zone of said water zone from said steam outlet.

19. The evaporator device according to claim 1, wherein said steam outlet is formed in an encircling manner above said water zone.

20. The evaporator device according to claim 19, wherein said steam outlet is formed in an encircling manner above a radially outer zone of said water zone.

21. The evaporator device according to claim 19, wherein a steam line emerging from said steam outlet is provided.

22. A steamer comprising:
   an evaporator device according to claim 1;
   a water reservoir and a water line from the water reservoir to said evaporator device;
   a muffle for preparation of food by means of steam; and
   a steam line from said evaporator device to said muffle.

* * * * *